Patented June 3, 1952

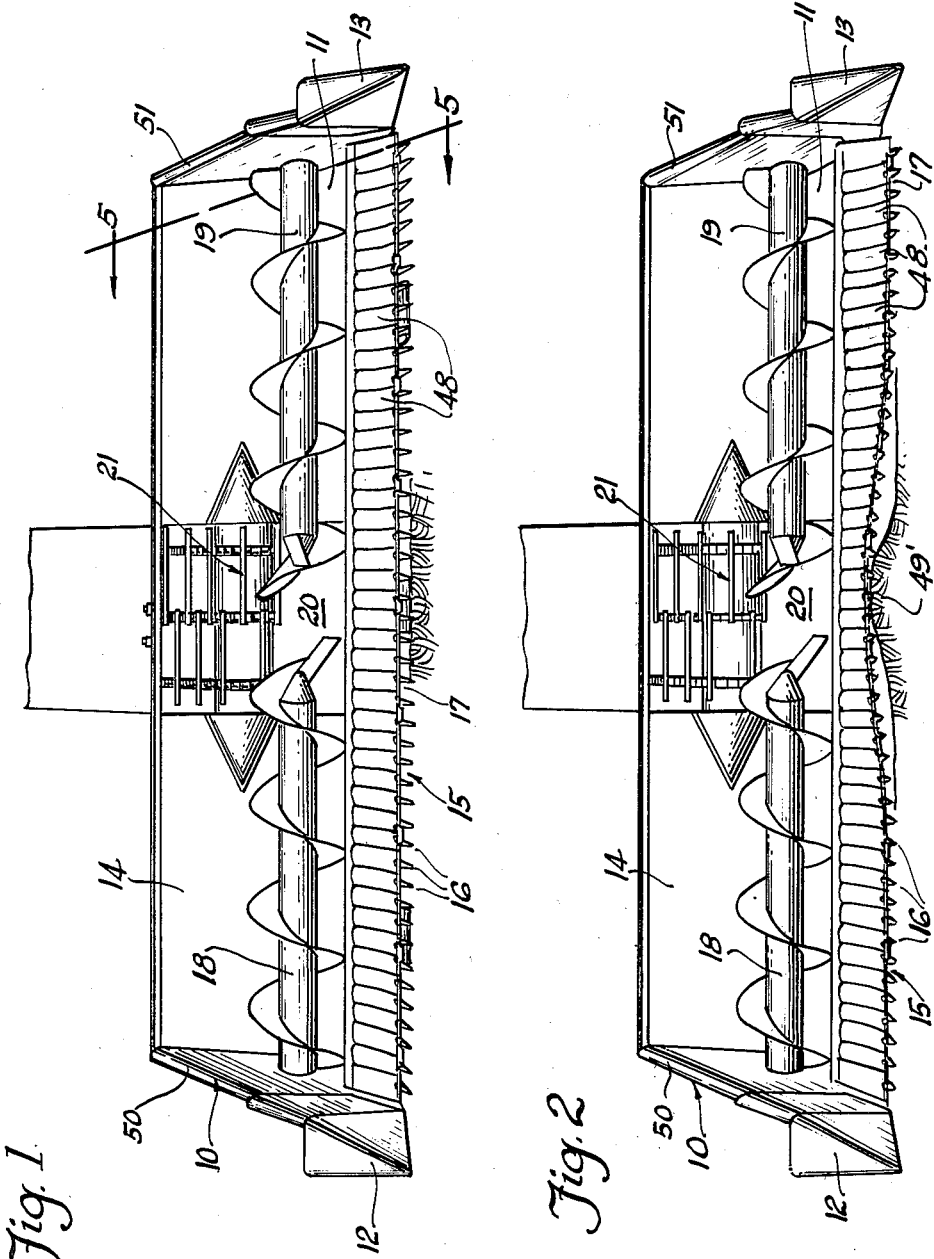

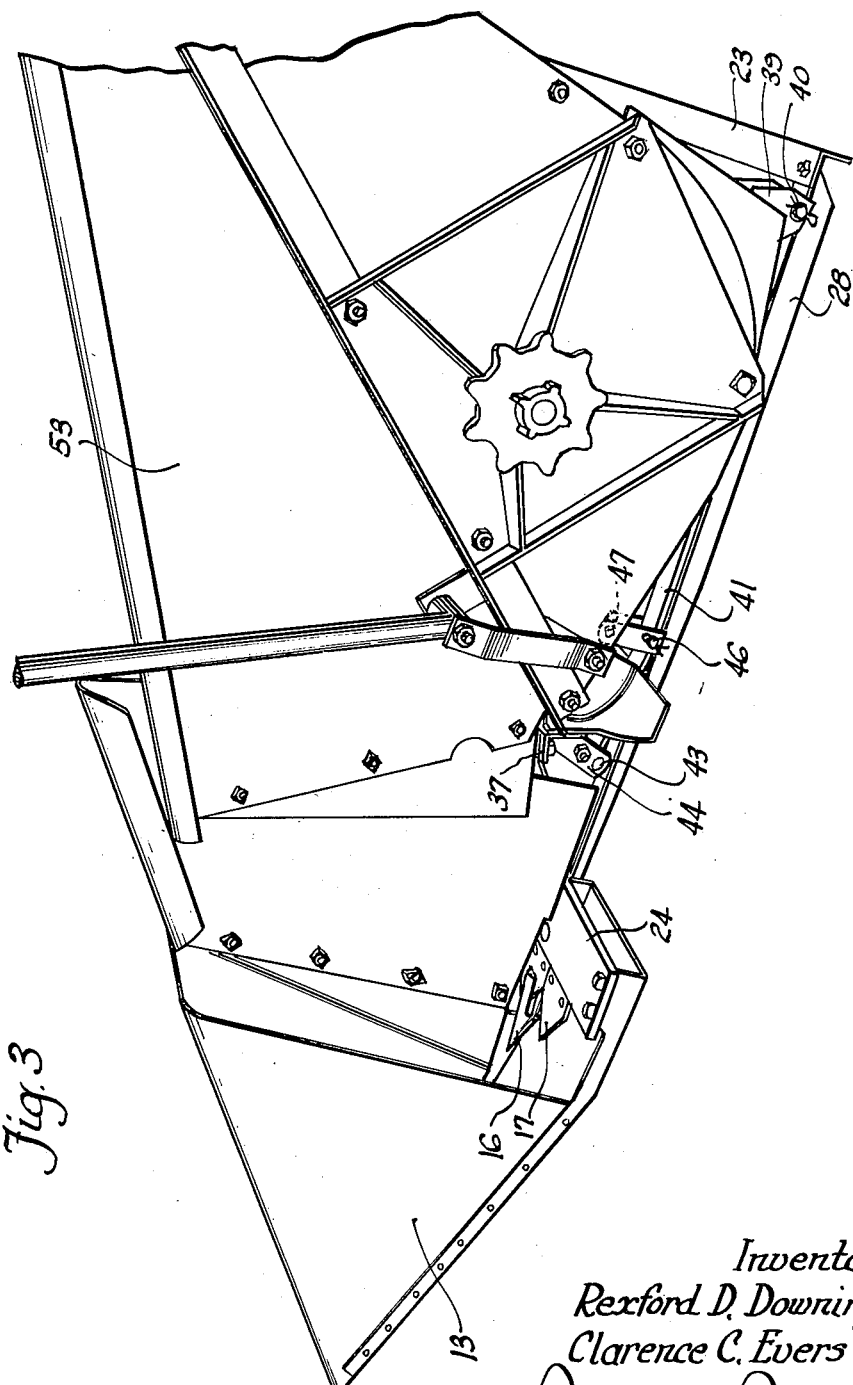

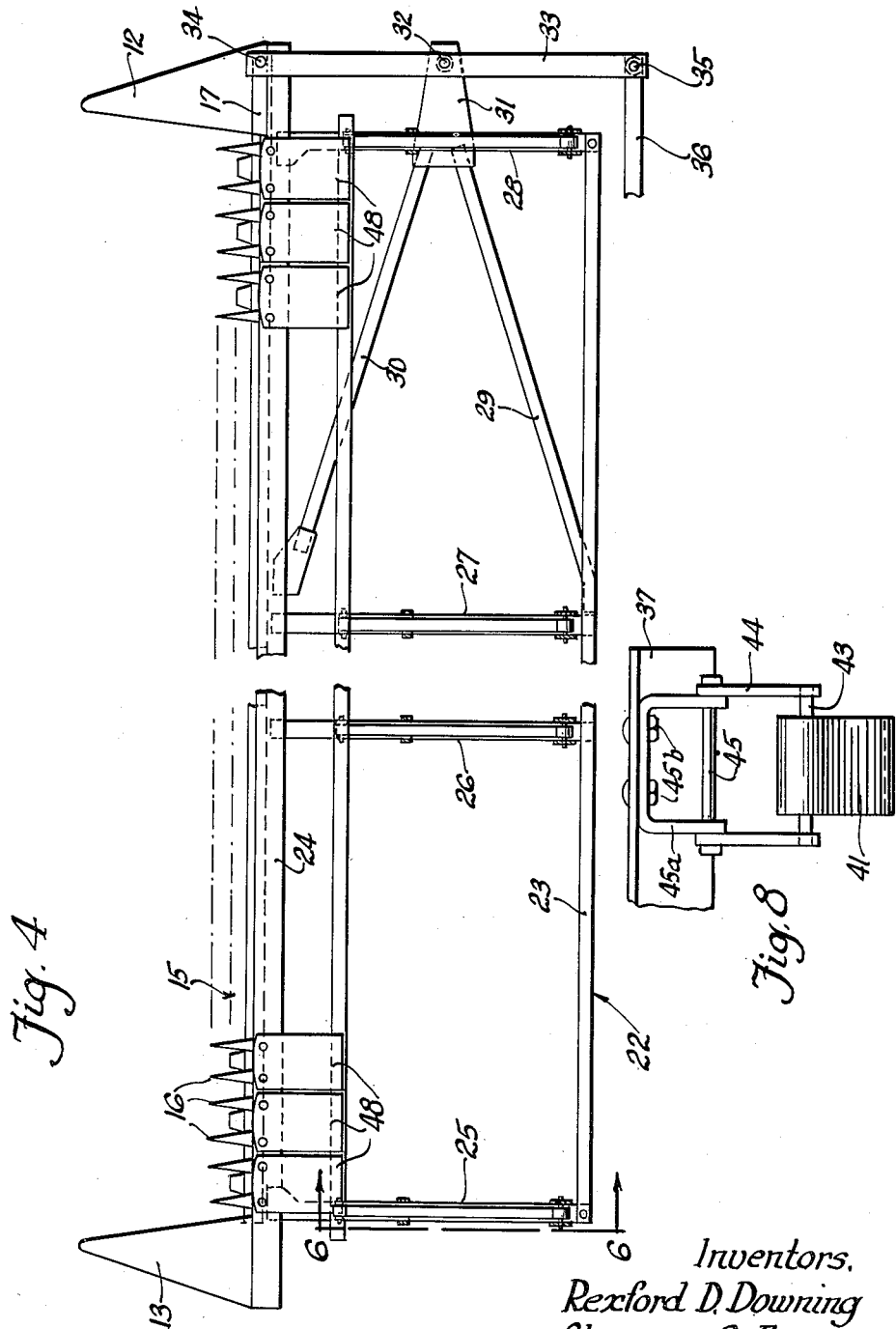

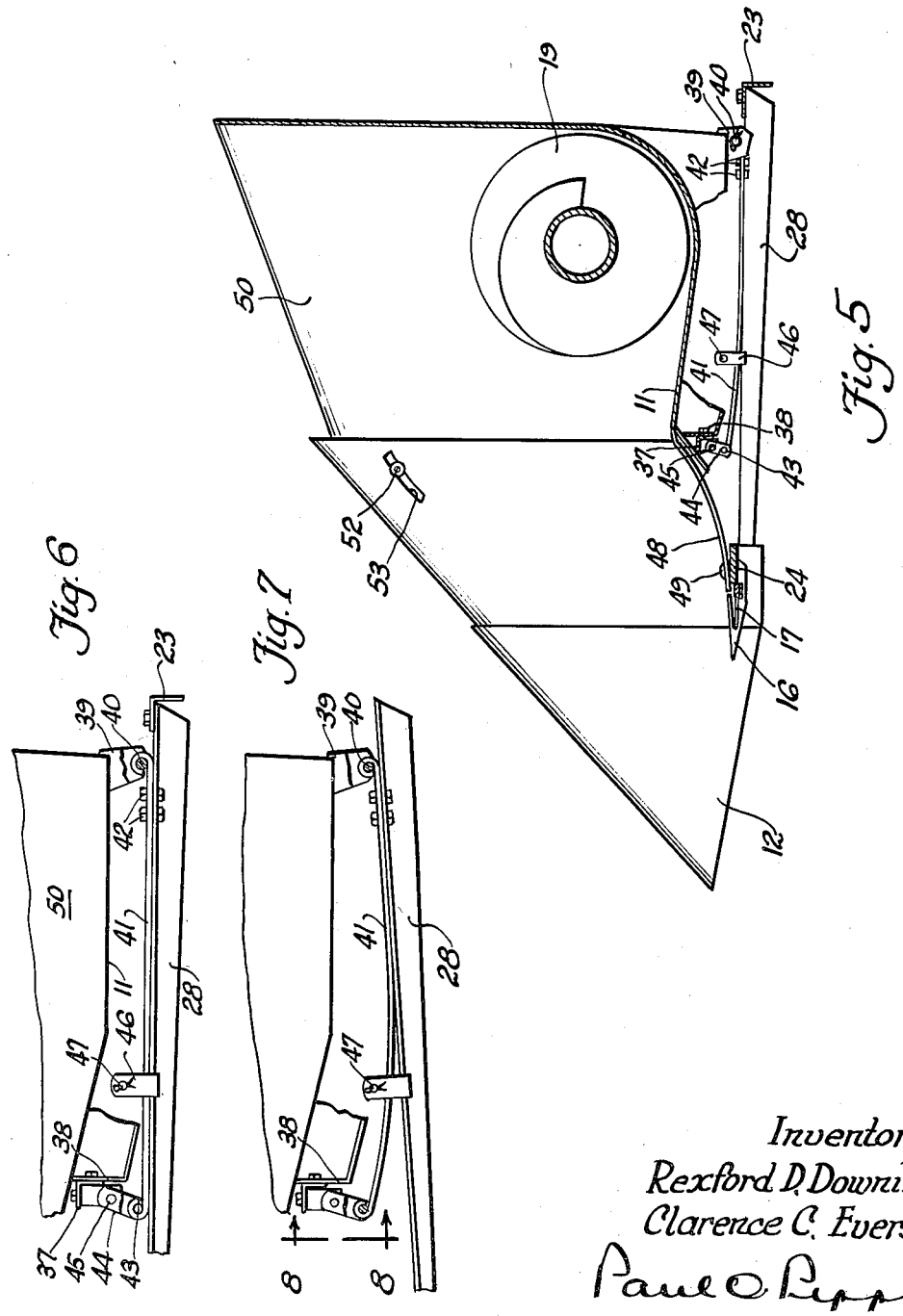

2,599,438

UNITED STATES PATENT OFFICE 2,599,438

FLOATING CUTTER BAR FOR HARVESTERS

Rexford D. Downing, Moline, Ill., and Clarence C. Evers, Davenport, Iowa, assignors to International Harvester Company, a corporation of New Jersey Application October 28, 1948, Serial No. 56,992

2 Claims. (Cl. 56—158)

This invention relates to a new and improved floating cutter bar for harvesters.

Harvesting machines for grain and small grains in particular employ a transversely extending reciprocating cutter bar to effect a cutting of the grain at the time of its entrance into the machine whether it be a binder, a thresher, or any one of several types of grain machines. The cutter bar, as a rule, forms a part of a platform upon which the grain falls after it has been cut. Vertical adjustment of the cutter bar is accomplished through vertical adjustment of the platform. Prior to the present time cutter bars have been mounted relatively rigidly with respect to their platforms and if the machine struck an obstruction it was necessary for the entire platform to be moved vertically or otherwise in order to relieve the cutter bar and prevent damage thereto. Yieldable means for a large platform such as employed on many harvesting machines is difficult to construct and very often not effective in providing the necessary yieldability for rigidly mounted cutter bars.

A principal object of this invention is to provide a cutter bar for harvesting machines floatable with respect to the platform on which it is mounted.

An important object of this invention is to provide a cutter bar located along the forward edge of a harvester platform and mounted in such a manner that it is permitted certain relative vertical floating movement with respect to the platform on which it is mounted.

Another important object of this invention is to supply a harvester platform with a reciprocating cutter bar adapted for hinged mounting on the platform and capable of generally vertical swinging movement in cooperation with spring means for normally urging the cutter bar downwardly from the platform.

A still further important object of this invention is the provision of means in a cutter bar of the reciprocating type for permitting considerable flexibility along the entire length thereof and to permit continued operation and proper feeding of material being cut even though portions of the cutter bar are positioned at various ground levels.

Other and further important objects of this invention will become apparent from the disclosures in the following specification and accompanying drawings.

In the drawings:

Fig. 1 is a front elevational view of the floating cutter bar for harvesters of this invention.

Fig. 2 is a view similar to Fig. 1 showing the cutter bar flexed due to ground contour.

Fig. 3 is a perspective view drawn to an enlarged scale showing substantially one end of the cutter bar and platform as shown in Figs. 1 and 2.

Fig. 4 is a top plan view of the device of Fig. 1 showing portions thereof removed to indicate the construction on the underside thereof.

Fig. 5 is a sectional view drawn to an enlarged scale taken on the line 5—5 of Fig. 1.

Fig. 6 is a sectional view taken on the line 6—6 of Fig. 4.

Fig. 7 is a sectional view similar to that of Fig. 6 with the cutter bar hinge arms moved with respect to the platform.

Fig. 8 is a sectional view drawn to an enlarged scale taken on the line 8—8 of Fig. 7.

As shown in the drawings, reference numeral 10 indicates generally a harvester platform of the type usually employed on harvester threshers. The platform consists of a transversely extending floor portion 11 defined by side gathering or separating points 12 and 13 and an adjoining back wall 14. The forward end of the platform is provided with a transversely disposed cutter bar 15 having spaced forwardly projecting finger guards 16 and a laterally reciprocable blade 17 adapted to cut standing grain. Rearwardly of the cutter bar 15 and on the trough-like bottom of the platform 11 cooperative auger feeding devices 18 and 19 are rotatably driven to effect lateral feeding of grain cut by the cutter bar to a central portion 20 of the platform, wherein the grain is carried upwardly and rearwardly for subsequent treatment by means of an undershot conveyor 21.

The platform 10 includes a supporting structure 22 comprising a structural angle cross member 23 at the rear thereof and a second structural flat and relatively flexible cross member 24 positioned forwardly of and parallel to the member 23, longitudinally extending members 25, 26, 27 and 28 join the cross members 23 and 24. Brace members 29 and 30 are adapted to reinforce the rectangular frame structure defined by the members 23, 24, 25 and 28. A member 31 acts as a gusset plate for the adjoining members 28, 29 and 30 and also as a pivotal support at 32 for a pitman 33 pivotally attached at its forward end at 34 to the reciprocal knife member 17 and joined at its rearward end at 35 to a reciprocating drive member 36. The cutter bar 15 is mounted directly on the flexible transverse member 24 defining this rectangular supporting structure. The bottom 11 of the platform 10, as best shown in Fig. 5, is carried on transversely disposed angle support members 37 and 38. The rearward end of the upper platform structure is provided with downwardly extending ear or lug members 39 for hinged attachment at 40 to the members 25, 26, 27 and 28.

Leaf spring members 41 are bolted at 42 to the members 25, 26, 27 and 28. These springs 41 extend forwardly to a hinge attachment at 43 to downwardly extending arms 44 hinged at 45 to a bracket 45a which are bolted at 45b to the angle supporting member 37. This construction is best shown in Fig. 8.

Bail-like members 46 are fastened to the supporting members 25, 26, 27 and 28 and have portions extending upwardly adjacent the lateral sides of the supporting members. A cross member or pin 47 forms the top and confining member of the leaf springs 41 and limits the separation of the upper platform portion consisting of the bottom 11 and the lower platform portion consisting of the rectangular frame and the cutter bar. Figs. 6 and 7 best show the relative movement between the two portions of the platform 10. Fig. 7 shows the cutter bar and supporting section in its lowermost position and Fig. 6 shows the cutter bar section moved upwardly against the action of the leaf spring 41 and with the two sections of the platform in abutting relationship.

Spring strip members 48 are riveted or otherwise fastened at 49 to the top of the flexible cross supporting member 24 and extend upwardly and rearwardly over the supporting members 37 and 38 to form a floor over which the grain cut by the cutter bar 15 can pass to the bottom 11 of the platform 10. The plate members 48 are relatively narrow as shown in Figs. 1 and 2 and are conducive to permit flexing of the cutter bar intermediate its ends and along the entire length thereof as the contour of the ground requires such flexing. As best shown in Fig. 2 a ground obstruction 49' is located approximately in the center of the platform 10 and the cutter bar with its narrow plates 48 is flexed upwardly in order to permit passage of the platform over the irregular ground contour. The forward brace or supporting member 24 is a substantially flat spring bar which may be conveniently flexed for the successful operation of the cutter bar. A rigid metal floor structure would substantially prevent flexing whereas the narrow spring members 48 easily yield for over-all flexing of the cutter bar.

It should be noted that the gathering points 12 and 13 are mounted on the cutter bar supporting member 24 and as such move with the cutter bar 15. Relative movement between the points 12 and 13 with side members 50 and 51 forming part of the bottom 11 constituting the upper portion of the platform is permitted by reason of bolt or pin members 52 attached to the side sheets 50 and 51 and extending through arcuate slots 53 in the point members 12 and 13. The pins 52 are adapted for sliding movement through the arcuate slots 53.

In operation, the harvester platform of this invention is adapted for movement through a field of standing grain. The reciprocating cutter bar 15 is adapted to cut off the grain closely adjacent the ground so that the grain head and its supporting stalk falls rearwardly onto the platform bottom 11, at which time the auger conveyors 18 and 19 feed the grain centrally to the open space 20 where it is picked up by the upwardly extending undershot conveyor 21. The cutter bar is flexible in two ways. It has overall yielding ability by reason of the hinging of the lower frame section with respect to the upper platform portion as determined by the hinging leaf springs 41. Further, irregular ground contours are compensated for by a flexing of the cutter bar intermediate its ends because of the flat supporting member 24 and the narrow spring plate members 48.

Numerous details of construction may be varied throughout a wide range without departing from the principles disclosed herein and we therefore do not propose limiting the patent granted hereon otherwise than as necessitated by the appended claims.

What is claimed is:

1. In a harvester platform comprising a supporting structure, an auger carrying trough mounted on said supporting structure, a cutting mechanism along the leading edge of the platform supporting structure, lengthwise disposed yieldable members arranged in spaced apart position and connected at one end to the underneath portion of the trough and at the other end to the supporting structure, guard fingers carried at the forward edge of the supporting structure, a reciprocable knife operable through said guard fingers, and spring strip members arranged in side-by-side relationship and attached at their forward ends to the guard fingers and adapted to extend rearwardly over said auger trough, said knife adapted to flex with the yieldable members in response to contact with uneven ground contour.

2. A harvester platform having cutting mechanism along its leading edge comprising a series of guard fingers, a transversely disposed flexible cross member fastened to each of said guard fingers, individual spring strip members arranged lengthwise in parallel side-by-side relation and connected at their forward ends to said guard fingers and said transversely disposed flexible cross member, and a knife reciprocable through the guard fingers and adapted to flex with the guard fingers in response to ground contour.

REXFORD D. DOWNING.
CLARENCE C. EVERS.

REFERENCES CITED

The following references are of record in the file of this patent:

UNITED STATES PATENTS

| Number | Name | Date |
| --- | --- | --- |
| 298,249 | Smith | May 6, 1884 |
| 1,199,678 | Elliason | Sept. 26, 1916 |
| 1,598,843 | Bauercamper | Sept. 7, 1926 |
| 1,996,294 | Hume et al. | Apr. 2, 1935 |
| 2,099,471 | Edgington | Nov. 16, 1937 |
| 2,102,710 | Hume et al. | Dec. 21, 1937 |